(12) United States Patent
Kato et al.

(10) Patent No.: US 7,072,766 B2
(45) Date of Patent: Jul. 4, 2006

(54) GUIDANCE INFORMATION PROVIDING SYSTEM

(75) Inventors: Hiromitsu Kato, Machida (JP);
Hiroaki Kawamichi, Tokyo (JP);
Shigetoshi Sameshima, Machida (JP)

(73) Assignee: Hitachi, Ltd., Tokyo (JP)

( * ) Notice: Subject to any disclaimer, the term of this patent is extended or adjusted under 35 U.S.C. 154(b) by 111 days.

(21) Appl. No.: 10/820,034

(22) Filed: Apr. 8, 2004

(65) Prior Publication Data

US 2004/0260459 A1    Dec. 23, 2004

(30) Foreign Application Priority Data

May 22, 2003   (JP)   ............................. 2003-144982

(51) Int. Cl.
*G01C 21/00*   (2006.01)
(52) U.S. Cl. ...................................... 701/211; 701/201
(58) Field of Classification Search ............. 340/691.1
See application file for complete search history.

(56) References Cited

U.S. PATENT DOCUMENTS

| | | | | |
|---|---|---|---|---|
| 5,158,310 A | * | 10/1992 | Tannehill et al. | 280/33.992 |
| 5,406,271 A | * | 4/1995 | Sonnendorfer et al. | 340/5.91 |
| 5,630,068 A | * | 5/1997 | Vela et al. | 705/1 |
| 5,821,513 A | * | 10/1998 | O'Hagan et al. | 235/383 |
| 6,091,956 A | * | 7/2000 | Hollenberg | 455/456.5 |
| 6,618,683 B1 | * | 9/2003 | Berstis et al. | 702/94 |
| 2002/0123843 A1 | | 9/2002 | Hood | |
| 2003/0060978 A1 | | 3/2003 | Kokojima et al. | |
| 2004/0217166 A1 | * | 11/2004 | Myers et al. | 235/383 |

FOREIGN PATENT DOCUMENTS

| | | |
|---|---|---|
| EP | 1209933 | 5/2002 |
| EP | 1260791 | 11/2002 |
| EP | 1288624 | 3/2003 |
| JP | 11-73399 | 3/1999 |
| JP | 2002-284012 | 10/2002 |

* cited by examiner

*Primary Examiner*—Michael J. Zanelli
(74) *Attorney, Agent, or Firm*—Antonelli, Terry, Stout and Kraus, LLP.

(57) ABSTRACT

A guidance system which may include: a position direction obtaining unit which obtains a current position and moving direction of an operation device; a destination information obtaining unit which obtains destination information; a route information generating unit which generates route information to the destination from the current position by use of map information; an output device management unit which manages an installation position of the output device; an output device selecting unit which selects one output device from the plurality of output devices, on the basis of information of the current position, moving direction and installation position of the output device; a selected output device presenting unit which presents an information that specifies the selected output device to the operation device; and an information display instructing unit which displays the generated route information displayed on the selected output device in accordance with the information to be specified.

11 Claims, 15 Drawing Sheets

FIG.3

| DESTINATION | PROCESSED |
|---|---|
| RECEPTION DESK | × |
| EMBARKATION CHECK DESK | |
| BOARDING GATE | |
| . . . | |

| DEVICE ID 801 | DEVICE TYPE 802 | INSTALLATION STATE 803 | | | USE STATE 804 | SELECTED COLOR 805 | IP ADDRESS 806 |
|---|---|---|---|---|---|---|---|
| | | X | Y | DIRECTION e | | | |
| 1 | DISPLAY | 2000 | 2000 | (0,1,0) | VACANT | — | 201.152.13.1 |
| 2 | PROJECTOR | 3000 | 2000 | (0,0,1) | VACANT | — | 201.152.13.2 |
| 3 | PROJECTOR | 2000 | 3000 | (1,0,0) | IN USE | YELLOW | 201.152.13.3 |
| ... | | | | | | | |

| SERIAL NUMBER 401 | OSCILLATOR ID 402 | RECEIVER ID-A 403 | MEASURED VALUE A 404 | RECEIVER ID-B 405 | MEASURED VALUE B 406 | RECEIVER ID-C 407 | MEASURED VALUE C 408 |
|---|---|---|---|---|---|---|---|
| 1 | 12345 | 23 | 6430 | 34 | 7100 | 24 | 7200 |
| 2 | 2468 | 17 | 5500 | 18 | 6450 | 35 | 6850 |
| 3 | 13579 | 18 | 4680 | 19 | 5890 | 42 | 7350 |
| ... | ... | ... | ... | ... | ... | ... | ... |

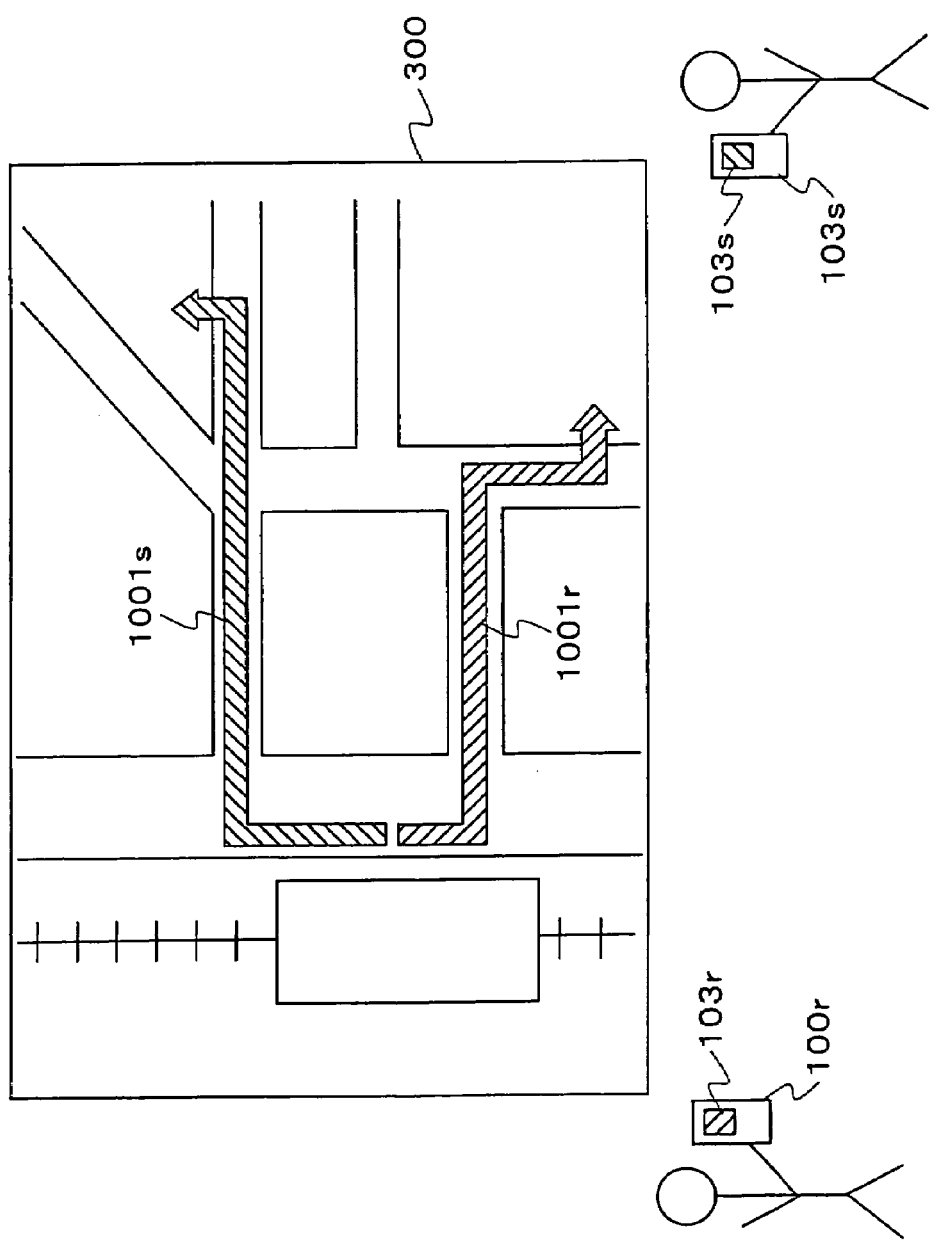

GUIDANCE INFORMATION PROVIDING SYSTEM

BACKGROUND OF THE INVENTION

The present invention relates to a service providing technology which utilized positional information, and in particular, relates to a technology which provides guidance information to each user individually, in a public space where a lot of users move in miscellaneous directions, represented by airports, shopping centers, etc.

In traffic bases such as stations, airports, etc., or in public spaces like shopping centers and amusement parks, destinations (of guests) are miscellaneous. In this connection, for a guest who is unfamiliar with the place, information centers, direction boards, Kiosk terminals, etc., are disposed so that the guidance information is provided.

However, an equipment which is capable of providing the guidance information exits only at a limited place, and when a guest wishes to have the guidance information, it is necessary for him/her to go to such a limited place. Therefore, there are many cases where the guest can not have the guidance information without going such a limited place, when he/she wishes to obtain it.

As an item by which the guidance information can be obtained at the place where it is wished, there is a technology of accessing to a Web site of the guidance information from a portable telephone, a PDA with a wireless communication function, etc., and of obtaining the guidance information from there. However, the suchlike technology has such problems of operability that it is troublesome to start up a Web browser or input a URL, etc. in order to access a desired site. Also, even if it could be accessed, in case of map information, it takes time to complete recognition of a current position and a direction of facing, a direction of a destination, and usability is not good. Furthermore, portable telephones, PDAs, etc. have small display screens and have a problem of visibility.

As an item which solves the problems of operability and usability, for example, there is a navigation system which navigates users up to a selling space of desired foodstuffs, by use of an information output device which is attached to a shopping cart used in a store such as a shopping center, etc. (e.g., see, Japanese Patent Laid-open Publication No. 2002-284012 (hereinafter, referred to as Patent Document 1)).

In this technology, information which can be provided to the guest as the guidance information is limited to information in the floor, and therefore, an operation to obtain the guidance information is easier than an operation to obtain general information from a Web site, etc. However, since the guidance information is displayed on an output device attached to a cart, the problem of visibility is not improved.

On one hand, as an item which improves visibility, there is a system which flexibly realizes various information services desired by users, not only on a specific terminal but also utilizing universally an information equipment as a network resource which exists at a periphery (e.g., see, Japanese Patent Laid-open Publication No.H11-73399 (hereinafter, referred to as Patent Document 2)). By utilizing this technology, it is possible to switch a destination of a display output not only on a dedicated terminal but also to an output device such as a desired display, etc. which exist at a periphery according to need.

SUMMARY OF THE INVENTION

However, in case that the guidance information is outputted to an information equipment which exists at a periphery, by utilizing the technology disclosed in Patent Document 2, it is difficult for the user to discriminate an information equipment utilized by himself/herself, in such a public space that a plurality of persons come and go. When a targeted person to whom information is provided is made to be specified easily, with respect to each network resource, in turn, also for third parties of unspecified majority, a recipient of the guidance information opened to public is apt to be specified easily.

In this connection, a first object of the present invention is to provide a technology which provides information with good visibility, by dynamically utilizing a peripheral equipment, and a technology easy to specify the peripheral equipment to which information is provided.

Also, a second object of the present invention is to provide a technology hard to specify the person to whom the information, being provided to a peripheral equipment, belongs, except the user who requests it.

In order to solve the above-described problems, a positional information service providing system of the present invention has a means which selects an optimum peripheral equipment, and a means which presents the guidance information on the selected peripheral equipment in a manner that only a user oneself can recognize.

Concretely, it provides a guidance information providing system which outputs the guidance information to a destination in accordance with an operation from a movable operation device, to any one of a plurality of output devices connected to the operation device through a network, comprising: a position direction obtaining means which obtains a current position and a moving direction of the operation device, a destination information obtaining means which obtains information to the destination, a guidance information generating means which generates the guidance information of the destination from information of the current position and the destination by use of map information possessed in advance, an output device management means which manages information of an installation position of the output device, an output device selecting means which selects one output device from the plurality of the output devices, on the basis of the information of the current position, the moving direction, and the installation position of the output device, a selected output device presenting means which presents information of specifying the selected output device to the operation device, and an information display instructing means which displays the guidance information generated in the selected output device, in accordance with the specified information.

BRIEF DESCRIPTION OF THE INVENTION

FIG. 3 is a view for explaining a portion which relates to destination information of an IC card 900 of this embodiment.

FIG. 4 is one example of an output device management table of this embodiment.

FIG. 7 is one example of a distance information management table in this embodiment.

FIG. 15 is a view for explaining another display example of the present invention.

DESCRIPTION OF THE PREFERRED EMBODIMENTS

Hereinafter, one embodiment of a guidance information providing system to which the present invention is applied will be described by use of a guidance service in an airport as an example. As a matter of course, a place of application is not limited to an inside of an airport, but it is applicable to general public spaces such as hospitals, shopping centers, stations, amusement parks, etc.

Also, in this embodiment, such a case that a cart is used as an interface with a user will be described as an example. This is because in general a user puts his/her baggage on a cart while moving around an airport. As a matter of course, an interface with a user is not limited to a cart. If it is a device which has each function provided in a cart which will be described later, it is fine even if it is a portable terminal such a portable telephone, a PDA, etc., and is not limited in particular.

Also, in this embodiment, it is assumed that a user inserts an IC card, which is used also as a ticket of a boarding flight, into a predetermined loading slot, and guidance is carried out in accordance with information recorded in the IC card. It is assumed that, in the IC card, information of a place to which a user should go (destination information) in an airport, such as a reception disk of a boarding flight, a boarding gate, etc., is recorded together with ticket information. As described later, as a user proceeds with procedures on the premises, the destination information in the IC card is updated, in such a manner that prior to reception, a reception desk is set as a destination, and after the reception is completed, a boarding gate is set as a destination, etc. As a matter of course, a method which designates a destination is not limited to this.

Figure 1:
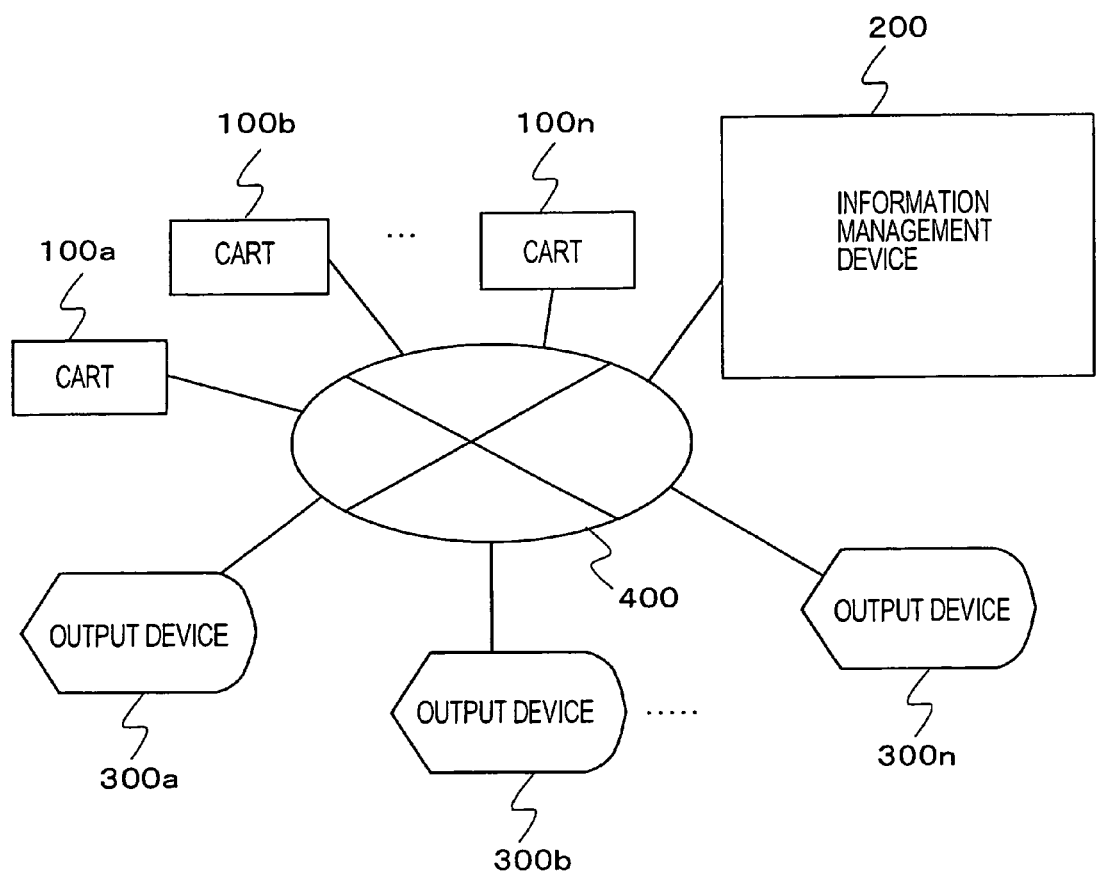
FIG. 1 is an overall block diagram of a guidance information providing system to which an embodiment is applied.

FIG. 1 is an overall block diagram of a guidance information providing system to which this embodiment is applied. As shown in this figure, the guidance information providing system has one or more carts 100a–100n as interfaces with users, an information management device 200 which manages various data necessary for providing the guidance information, and one or more output devices 300a to 300n which provide the guidance information to users. And, they are connected by a wireless network 400.

Here, there is no limitation of the number of the carts 100a to 100n and the output devices 300a to 300n. Also, in the following explanation, in case where it is not necessary to specify them individually, they are represented by a cart 100, an output device 300, respectively.

Figure 2:
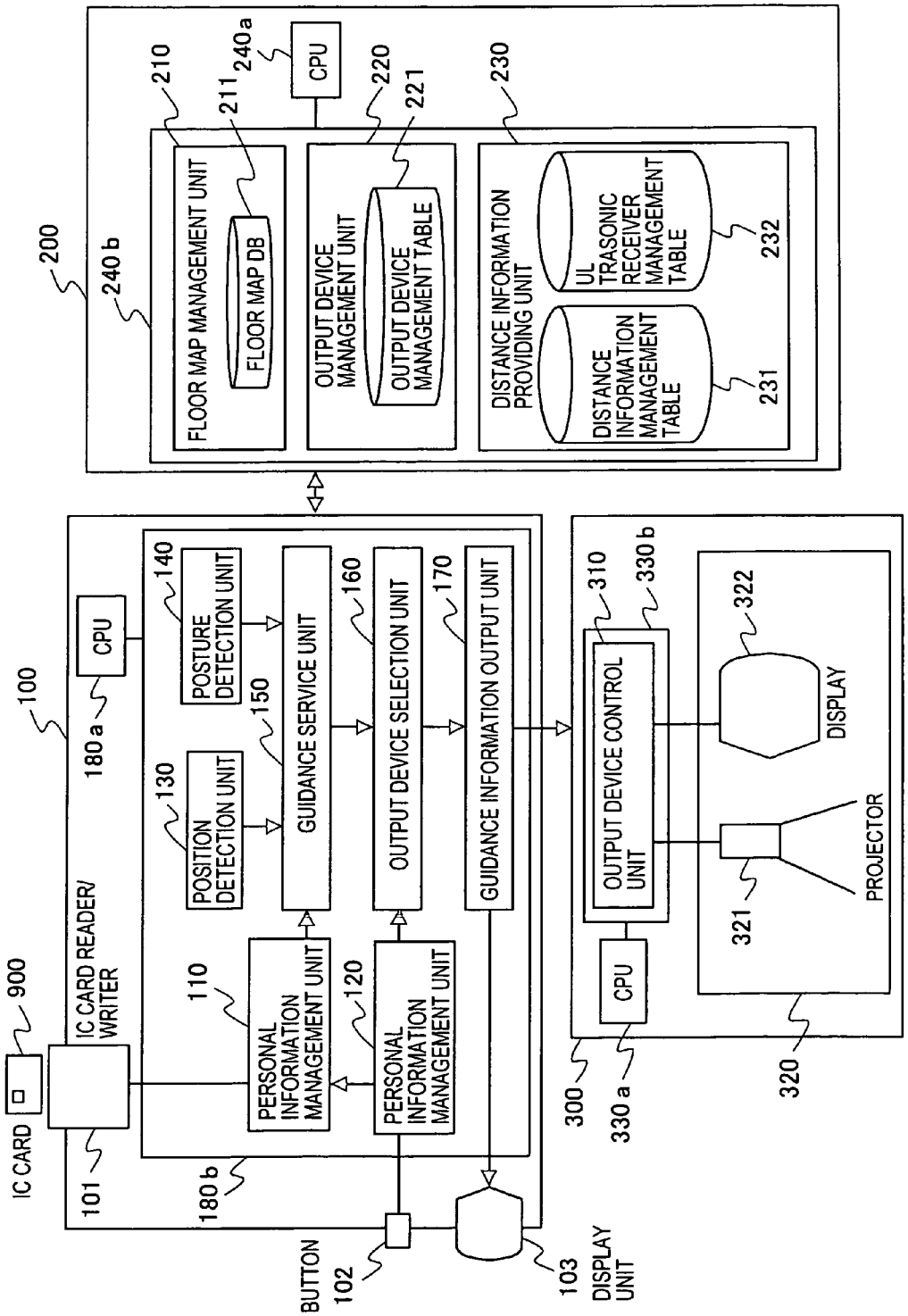
FIG. 2 is a functional block diagram of this embodiment.

FIG. 2 is a functional block diagram of the cart 100, the information management device 200, and the output device 300, respectively.

The cart 100 has an interface with a user in a guidance information providing system of this embodiment. Also, the cart 100 has functions to generate the guidance information for users by use of various information managed in the information management device 200, to select the output device 300 which presents the generated guidance information, and to transmit information to be displayed on the selected output device 300.

As external interfaces, the cart 100 has an IC card reader/writer 101, a button 102 and a display unit 103, and furthermore, as internal processing functions, the cart 100 has a personal information management unit 110, a position detection unit 130, an attitude detection unit 140, a guidance service unit 150, a guidance output instruction unit 120, an output device selection unit 160, a guidance information output unit 170, and a control unit 180a.

The information management device 200 has an floor map management unit 210 which manages a region which provides the guidance information to users (hereinafter, referred to floor), an output device management unit 220 which manages the output device 300 installed inside the floor, and a distance information providing unit 230 which manages a position of each cart 100. In accordance with a request from the cart 100, the information management device 200 provides information managed in these respective management units to the cart 100 as a source of request.

The output device 300 has an output device control unit 310 and a display device 320, respectively, to present the guidance information generated in the cart 100 to users in an easily understandable form.

In addition, the cart 100, the information management device 200, and the output device 300 have wireless interfaces, not shown, which exchange information mutually, respectively.

Next, a function of each unit of the cart 100 will be described.

The IC card reader/writer 101 reads out information including information of a destination (hereinafter, referred to as destination information) from an inserted IC card 900.

Here, one example of the information stored in the IC card 900, which relates to the destination information, will be described. FIG. 3 is a view for explaining the destination information, out of the information stored in the IC card 900. As shown in this figure, in the IC card 900, information of each destination in the order in which a user proceeds with procedures, such as reception desk information, embarkation check desk information, gate information, etc., is stored. Also, in the IC card 900, a field which stores a flag showing that processing at the destination is completed is set up with respect to each destination. In the personal information management unit 110 which will be described later, the following destination is extracted from the information stored in this IC card 900.

The button 102 is an interface which accepts a guidance information output request from a user. The user can instruct to output the guidance information by depressing this button 102, and can instruct to stop the output by releasing it.

The guidance output instruction unit 120 instructs start and stop of processing which generates the guidance information in the cart 100 to each unit. When it is accepted that a user depressed the button 102, the guidance output instruction unit 120 sends out a signal which requests outputting the guidance information to the personal information management unit 110 and the output device selection unit 160. Also, when it is detected that a user released the button 102, the guidance output instruction unit 120 regards it as a termination instruction of outputting the guidance information, and stops transmission of the signal which requests outputting the guidance information.

The display unit 103, as described later, presents a rough direction to which there exists the output device 300 which displays the guidance information. In this embodiment, the display unit 103 is provided with three display units 103a, 103b, 103c, each indicates leftward, forward, and rightward output devices 300, respectively. The three display units 103a, 103b, 103c light a predetermined color the same as the display color of the guidance information to users of the cart 100. Thus users can recognize the color and the specific output device 300 of which the guidance information for him/her is presents.

The personal information management unit 110 manages the destination information, etc. read out through the IC card reader/writer 102. And, it receives an instruction of the guidance information output start from the guidance output instruction unit 120, and outputs the destination information to the information guidance service unit 150, and thereby, requests generation of route information up to a destination.

The position detection unit 130 detects a current position of the cart 100 by a method which will be described later.

The attitude detection unit 140 detects a current direction of the cart 100 by a method which will be described later.

Here, in this embodiment, positions of the cart 100, the output device 300, etc. are managed by two-dimensional coordinates (x, y) with a predetermined point as the original point.

The guidance service unit 150 searches a guidance route up to a destination, and calculates a route up to the destination defined by the searched guidance route. Upon receiving the destination information from the personal information management unit 110, positional information of the cart 100 from the position detection unit 130, and attitude information (direction) of the cart 100 from the attitude detection unit 140, are obtained respectively. And, on the basis of these information, the floor map management unit 210 of the information management device 200 is accessed, and a route up to the destination by a well-known method is calculated.

The output device selection unit 160 selects the output device 300 which outputs the guidance information. Here, the guidance information in this embodiment is information which shows for example, a direction to which the cart 100 should be moved, and in this embodiment, is shown by an arrow, etc.

The output device selection unit 160 receives positional information and information of a direction of the cart 100 together with the route information, from the guidance service unit 150, accesses to the output device management unit 220 of the information management unit 200, and selects the output device 300 by a method which will be described later. And, the guidance information to the destination is calculated from the selected output device and the received route information.

The guidance information output unit 170 carries out an instruction of display to the output device 300 selected by the output device selection unit 160 and the display unit 103. The guidance information output unit 170 instructs to the output control unit 310 of the selected output device 300 to display the guidance information, and instructs to the display unit 103 to display a region where the selected output device 300 exists.

Next, details of each functional unit of the information management device 200 will be described.

The floor map management unit 210 has a floor map data base 211 in which floor map information is stored, and manages the floor map information.

The output device management unit 220 manages installation position information of the output device 300 installed inside the floor and its availability in the output device management table 221. FIG. 4 shows one example of the output device management table 221.

As shown in this figure, the output device management table 211 has a device ID storage unit 801 which stores device IDs allocated to each output device 300 in advance, a device type storage unit 802 which stores types of devices such as a display and a projector, an installation state storage unit 803 which stores the coordinates (X, Y) of an installation position and a direction of installation (a direction vector e (Ex, Ey, Ez) which shows a direction to which a display surface faces), a use state storage unit 804 which stores use states by "vacant" or "in use", a selected color storage unit 805 which stored such a display color that the output device 300 in use utilizes for display, and an IP address storage unit 806 which stores IP addresses of the output device 300. The information stored in the output device management table 211 is managed with respect to each output device 300.

In addition, in this embodiment, a color is utilized as identification information of the guidance information to be provided to the cart 100 which has requested for the guidance information. Colors are selected for the respective carts 100 as a source of request one by one and the guidance information is indicated in the selected color. In the selected color storage unit 805, this selected color is stored.

The distance information providing unit 230 provides distance information to the cart 100 as a source of request. It has a ultrasonic receiver management table 232 which stores positional information of a ultrasonic receiver (described hereinafter), which is disposed in the floor in advance, the ultrasonic receiver, and a distance information management table 231 which stores distance information with the ultrasonic receiver, provided to each cart 100, and manages them.

Next, a function of each unit of the output device 300 will be described.

The output device control unit 310 of the output device 300 controls an output of a display device 320 in accordance with an instruction from the guidance information output unit 170.

The display device 320 displays map information, the guidance information, etc. obtained through the guidance information output unit 170. Here, as the display device 320, concretely, a projector 321 and a display 322, etc. are assumed. As the projector 321, not only a wall surface projection type, but also a type of projecting from a ceiling to a floor surface, are assumed. As the display 322, not only a wall surface type but also a floor surface embedded type, etc. are assumed. There is no limitation of a display system and a display location.

The cart 100, the information management device 200, and the output device 300, described above, have memories 180*b*, 240*b*, 330*b* and central processing units (CPUs) 180*a*, 240*a*, 330*a*, respectively.

The personal information management unit 110, the guidance output instruction unit 120, the position detection unit 130, the attitude detection unit 140, the guidance service unit 150, the output device selection unit 160, and the guidance information output unit 170 are functions to be realized by a program which is loaded in the memory 180*b* of the cart 100 and carried out in the CPU 180*a*.

Also, the floor map management unit 210, the output device management unit 220 and the distance information providing unit 230 are functions to be realized by a program which is loaded in the memory 240*b* on the information management device 200 and carried out in the CPU 240*a*. And, the floor map database 211, the output device management table 221, the distance information management table 231, and the ultrasonic receiver management table 232 are stored in the memory 240*b*, respectively.

The output device control unit 310 is function to be realized by a program which is loaded in the memory 330*b* on the output device 300 and carried out in the CPU 330*a*.

Also, the cart 100, the information management device 200, and the output device 300 have wireless communication interfaces and IP addresses, respectively, and a communication between the devices is carried out through these wireless communication interfaces.

Figure 5:
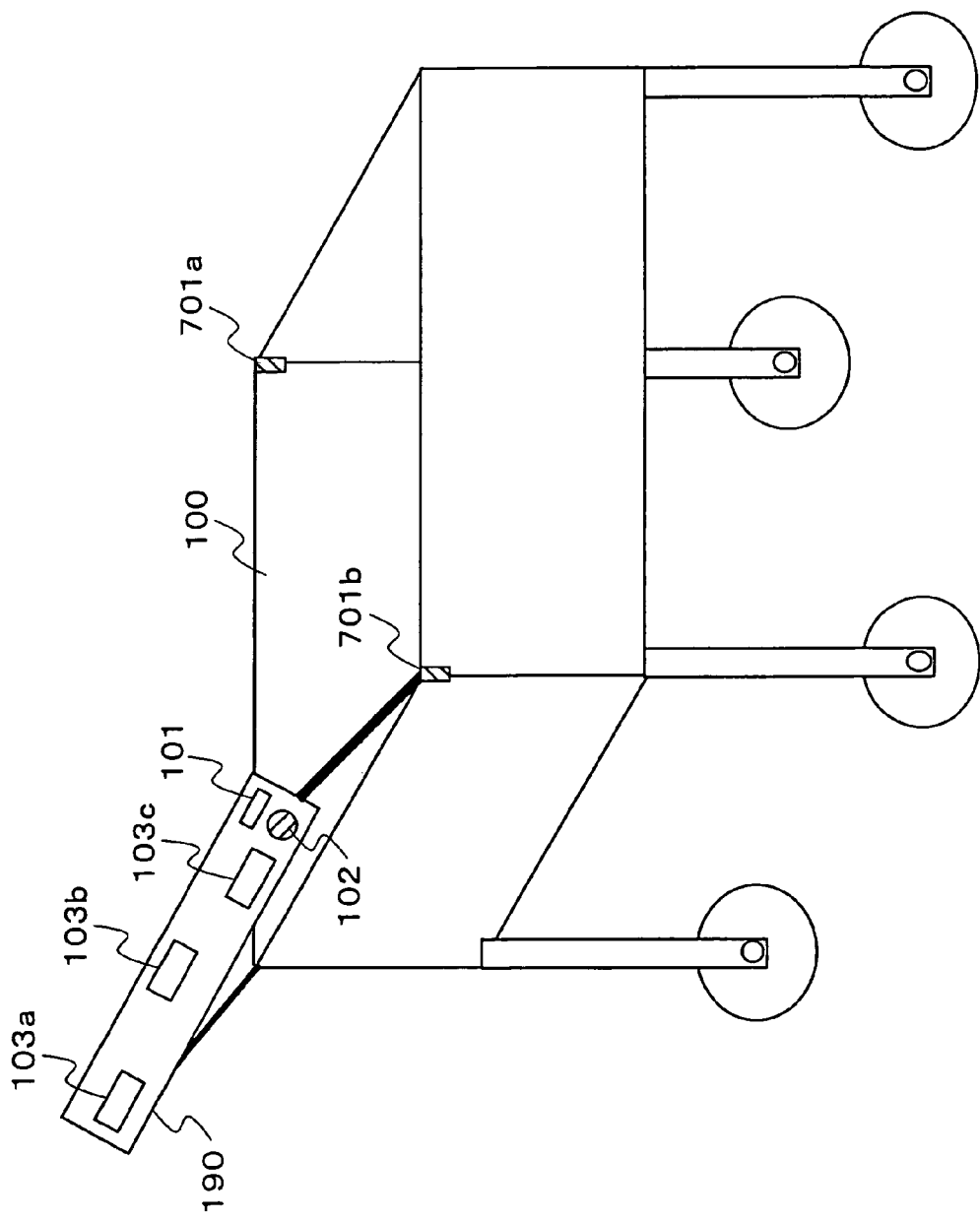
FIG. 5 is a schematic diagram of a cart 100 of this embodiment.

Here, a schematic diagram of the cart 100 is shown in FIG. 5.

In this embodiment, at a hand push unit 190 of the cart 100, the IC card reader/writer 101, the button 102 and the display units 103*a* to 103*c* are disposed. Also, at a front part and a rear part of the cart 100, ultrasonic oscillators 701*a* and 701*b* are placed one by one.

In this embodiment, one of the display units 103*a* to 103*c* is lit to show a rough direction of the output device 300 to which the guidance information to the user is outputted. For example, the display unit 103*a* shows that the output device 300 is located in a right direction, and the display unit 103*b* shows that the output device 300 is located in a front direction, and the display unit 103*c* shows that the output device 300 is located in a right direction, respectively.

The two ultrasonic oscillators 701*a* and 701*b* are for position detection and attitude detection, and as shown in this figure, they are, for example, disposed at opposite corners of a main body of the cart 100, etc. In this embodiment, by use of these oscillators, position detection and attitude detection of the cart 100 are carried out by a publicly known method described hereinafter. As a matter of course, the detection of position and attitude is not limited to using two ultrasonic oscillators. An another attitude detection means such as an electronic compass, a gyroscope, etc. may be used. In this case, the ultrasonic oscillator may be one piece, since it carries out only position detection. In addition, in the following explanation, particularly in case where it is not necessary to specify the ultrasonic oscillators 701*a* and 701*b*, respectively, they are described as ultrasonic oscillators 701.

In this embodiment, these ultrasonic oscillators 701 are assumed to carry out pulse oscillation of ultrasonic waves on a periodic basis. In this regard, however, a system of the ultrasonic oscillators 701 is not limited to this, and may be configured so as to oscillate ultrasonic waves, in response to any operation, such as, for example, insertion of the IC card 900, etc.

Here, a method which detects a position and an attitude of the cart 100 by use of these ultrasonic oscillators 701*a*, 701*b* will be described.

Figure 6:
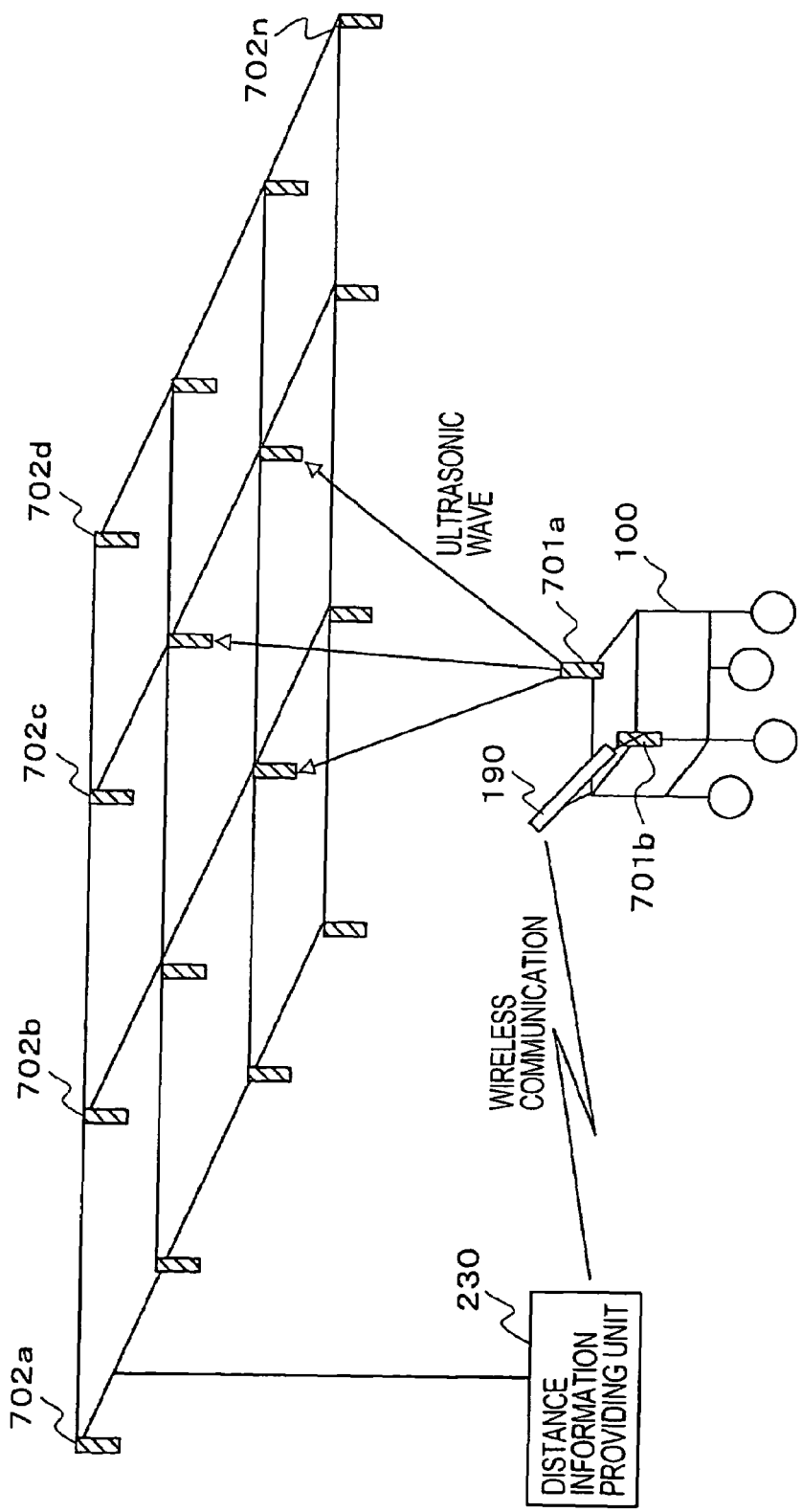
FIG. 6 is a view for explaining one example of a ranging system by use of ultrasonic waves.

FIG. 6 shows a schematic configuration of one example of a ranging system by use of ultrasonic waves. By using this figure, firstly, the ranging system by use of ultrasonic waves will be described.

As shown in this figure, in this embodiment, ultrasonic receivers 702*a* to 702*n* are disposed in advance in a lattice shape in a ceiling unit over a region to be guided. Hereinafter, in case where it is not necessary to specify them, these ultrasonic receivers are represented by ultrasonic receivers 702.

The distance information providing unit 230 manages a distance of each ultrasonic oscillator 701 and each ultrasonic receiver 702 measured by a publicly known method, and provides it in accordance with a request from the cart 100.

Concretely, the distance information providing unit 230 calculates distances from the ultrasonic oscillators 701 to the ultrasonic receivers 702 by multiplying such time that ultrasonic waves oscillated from the ultrasonic oscillators 701*a* and 701*b* of each cart 100 reach the ultrasonic receivers 702 with aerial propagation speed of sound waves, and manages them. The ultrasonic oscillator 701 as an oscillation source is specified, by such an arrangement that time at which ultrasonic wave is oscillated is defined in advance for each ultrasonic oscillator 702, or strength of ultrasonic pulses or a pulse rectangular shape is changed for each ultrasonic oscillator 701, etc.

The distances measured by the above-described method are stored in the distance information management table 231. In this embodiment, as the cart 100 moves, the most recent distance data is to be always managed by the distance information management table 231.

In addition, in this embodiment, the distance information providing unit 230, for example, extracts the ultrasonic receiver 702 received ultrasonic waves at the earliest stage, with respect to each ultrasonic oscillator 701, and stores respective IDs and measured values.

One example of the distance information management table 231 managed in the distance information providing unit 230 is shown in FIG. 7.

As shown in this figure, the distance information management table 231 is provided with a serial number 401 for data management, an oscillator ID 402 for specifying the ultrasonic oscillator 701. The distance information management table 231 is further provided with a receiver ID-A403, a measured value A404, a receiver ID-B405, a measured value B406, a receiver ID-C407, and a measured value C408, for storing an ID and a measured value of the ultrasonic receivers 702 which are received ultrasonic waves oscillated from the ultrasonic oscillator 701, in sequence from one received on ahead, respectively.

Figure 8:
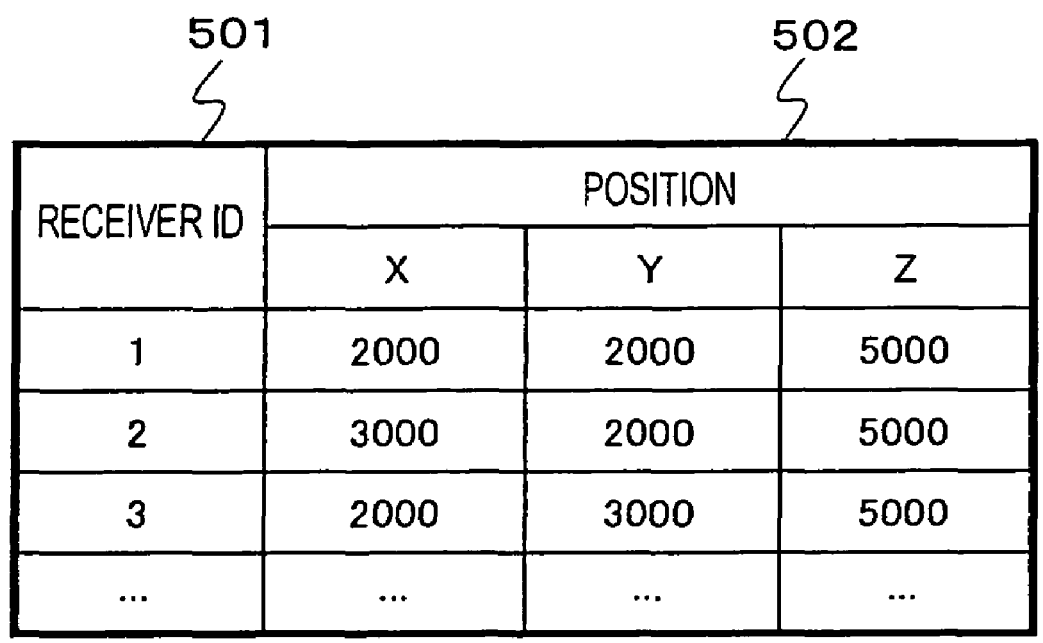
FIG. 8 is one example of an ultrasonic receiver management table in this embodiment.

Also, a position 502 which corresponded to a receiver ID 501 of each ultrasonic receiver 702 is managed in the ultrasonic receiver management table 232 shown in FIG. 8, by position coordinates with a predetermined position as the original position. A position of the ultrasonic receiver 702 for which a distance is measured can be obtained from this table.

The position detection unit 130 accesses to the distance information providing unit 230, and obtains three receiver IDs 403, 405, 407 and respective measured distance information, which correspond to respective oscillator IDs 402 of the ultrasonic oscillators 701*a*, 701*b*, incorporated therein, from the distance information management table 231. Also, obtained positions 502 of three ultrasonic receivers 702 are obtained from the ultrasonic receiver management table 232.

It is assumed that obtained position coordinates of the three ultrasonic receivers 702 are (X1, Y1), (X2, Y2), (X3, Y3), respectively. The position detection unit 130 calculates position coordinates (X, Y) and a height H of the ultrasonic oscillator 701 by solving a mathematical formula 1 by a principle of three-point measurement, making use of these values.

$$D1^2=(X-X1)^2+(Y-Y1)^2+H^2 \quad \text{[Mathematical formula 1]}$$

$$D2^2=(X-X2)^2+(Y-Y2)^2+H^2$$

$$D3^2=(X-X3)^2+(Y-Y3)^2+H^2$$

It is assumed that the ultrasonic oscillator 701 is disposed in a horizontal position to the cart 100, and the ultrasonic receiver 702 is disposed in a horizontal position at the ceiling. Therefore, the height H of the ultrasonic oscillator 701 is to be constant.

Figure 9:
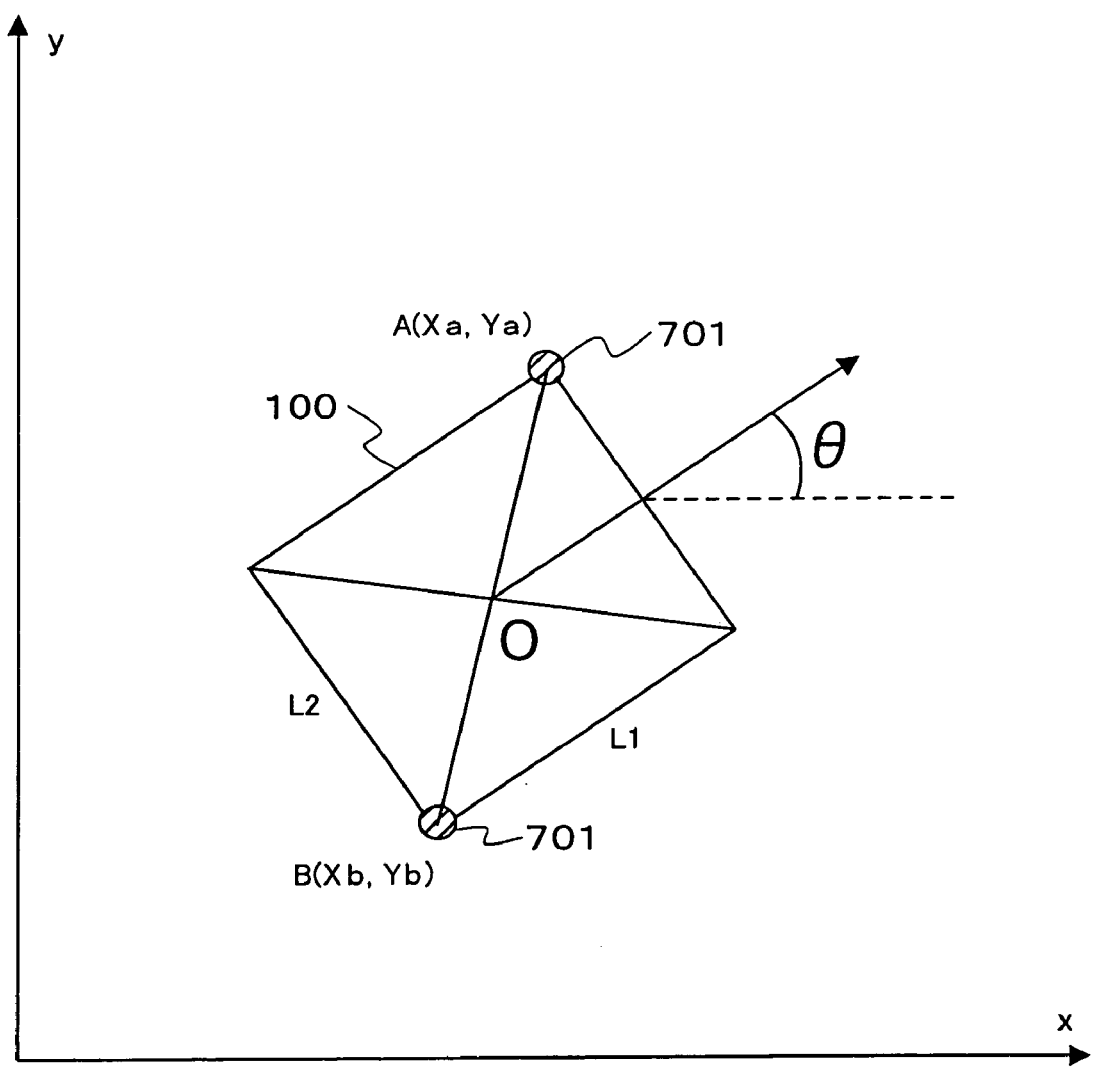
FIG. 9 is a view for explaining a method of calculating a position of a cart in this embodiment.

FIG. 9 is a view for explaining a method which calculates a position of the cart 100.

As shown in this figure, a central position O (XO, YO) of the cart 100 is calculated in accordance with a mathematical formula 2 by use of a position A (Xa, Ya) of the ultrasonic oscillator 701a and a position B (Xb, Yb) of the ultrasonic oscillator 701b.

$$XO = \frac{Xa + Xb}{2} \quad \text{[Mathematical formula 2]}$$

$$YO = \frac{Ya + Yb}{2}$$

The attitude detection unit 140 calculates a direction θ of the cart 100 in this coordinate system, by a mathematical formula 3, by use of the position coordinates of the ultrasonic oscillators 201a and 201b, obtained in the above-described manner.

$$\theta = \arctan\frac{Ya - Yb}{Xa - Xb} - \arctan\frac{L2}{L1} \quad \text{[Mathematical formula 3]}$$

Here, L1 represents a length in a forward direction of a cart, and L2 represents a width in a left and right direction.

In addition, the above-described position ranging method and direction calculation method are one example, and they are not limited to these methods.

Next, methods of output device selection and of its existence region determination by the output device selection unit 160 will be described.

In this embodiment, the output device selection unit 160 selects the unused output device 300 which is the closest to the cart 100 in a predetermined region around the cart 100, as a general rule.

Figure 10:
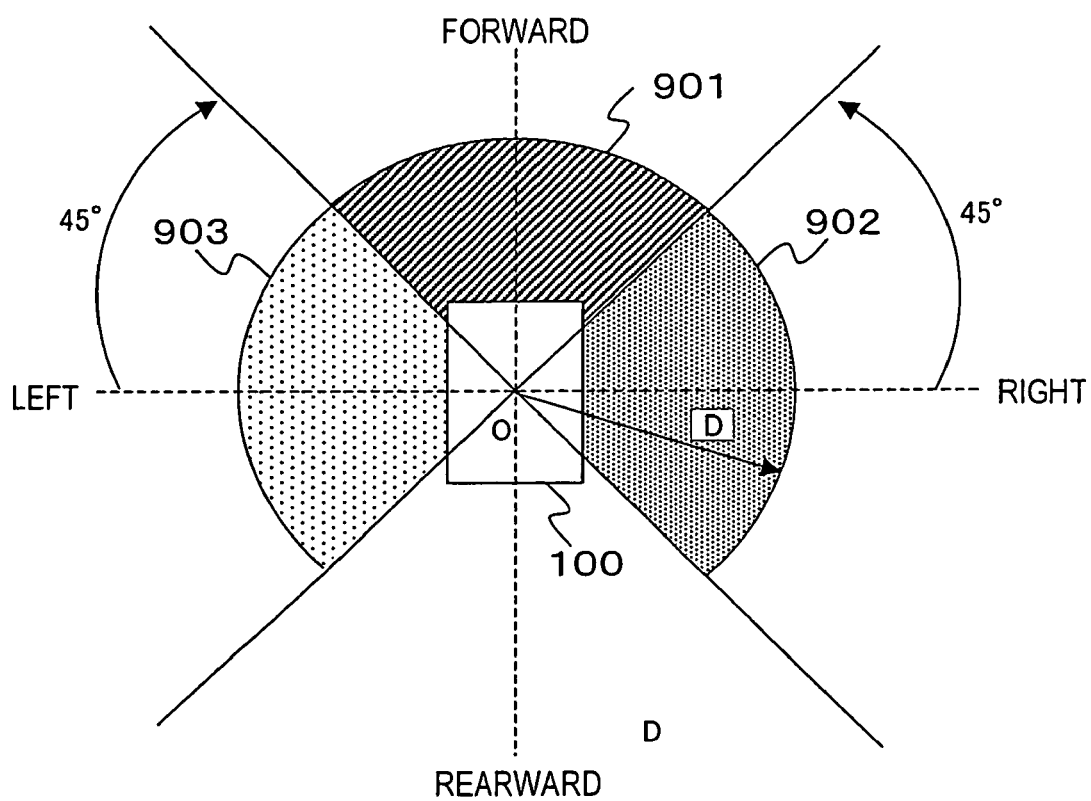
FIG. 10 is a view for explaining a definition of physical relationship between a moving direction of a cart and a region in which an output device exists, in this embodiment.

FIG. 10 is a view for explaining a definition of physical relationship between a moving direction of the cart 100 and a region in which the output device 300 exists.

The output device selection unit 160, as shown in this figure, selects the output device 300 among the output devices 300 disposed in any one of a forward region 901, a rightward region 902, and a leftward region 903, around the cart 100. Here, it is assumed that the forward region 901 is a region which has angles of 45° at left and right from the forward direction, respectively, and which has a distance D from a cart central position O (XO, YO). The rightward region 902 is similarly a region which has angles of 45° at left and right respectively from the rightward direction perpendicular to the forward direction. The leftward region 903 is a region which has angles of 45° at left and right respectively from the leftward direction perpendicular to the forward direction. The output device selection unit 160 decides the region in which the output devices 300 exist based upon a mathematical formula 4 for a distance, and based upon a mathematical formula 5 for an angle φ.

$$(X-XO)^2+(Y-YO)^2 \leq D^2 \quad \text{[Mathematical formula 4]}$$

Here, X and Y designate coordinates showing a position of each output device 300.

Rightward $-135° \leq \phi \leq -45°$ [Mathematical formula 5]

Forward $-45° < \phi < 45°$

Leftward $45° \leq \phi \leq 135°$

Here, the angle φ is obtained by a mathematical formula 6 on the assumption that a counterclockwise rotation on the basis of the direction θ of the cart 100 is a positive angle.

$$\phi = \arctan\frac{Y - YO}{X - XO} - \theta \quad \text{[Mathematical formula 6]}$$

In addition, since the output device 300 located in a region other than the above, i.e., in a rear region corresponds to a backside of a user of the cart 100, and is difficult to be seen, it is not adopted in this embodiment. Also, judgment of a region is not limited to this method. For example, it may set up a scope of 30° at both sides around a moving direction as a center, as the forward region, and a scope of 60° from the forward region, as the leftward, rightward regions, respectively.

In this embodiment, the output device selection unit 160 accesses to the output device management table 221, and, on the basis of data stored in the use state storage unit 804, extracts the output devices 300 whose use state are "vacant", and obtains values of (x, y) coordinates and IDs of the extracted respective output devices 300 from the installation position storage unit 803 and the device ID storage unit 801. And, by the mathematical formula 4 and the mathematical formula 5 as described above, the distance D and the angle φ with each output device 300 are calculated, and the smallest one of the distance from the output devices 300 which satisfies the conditions is selected. As a matter of course, the order of precedence for selection is not limited to this.

After that, the output device selection unit 160 notifies a device ID of the selected output device 300 to the output device management unit 220. The output device management unit 220 updates the use state storage unit 804 of the output device management table 221 of the notified output device 300 to "in use", and on the basis of the position coordinates of each output device 300, decides a display color so as not to be overlapped with a display color selected by another output device 300 whose installation position is in the vicinity, and stores the decided display color in the selected color storage unit 805 of the output device 300. And, the output device management unit 200 notifies the decided display color and an IP address of the output device 300 to the cart 100 as a source of notification. The output device selection unit 160 sends out information of the IP address, the display color of the decided output device 300, and a region in which the output device 300 exists, to the guidance information output unit 170.

Next, by use of a flow chart, an operation of each unit will be described.

Figure 11:
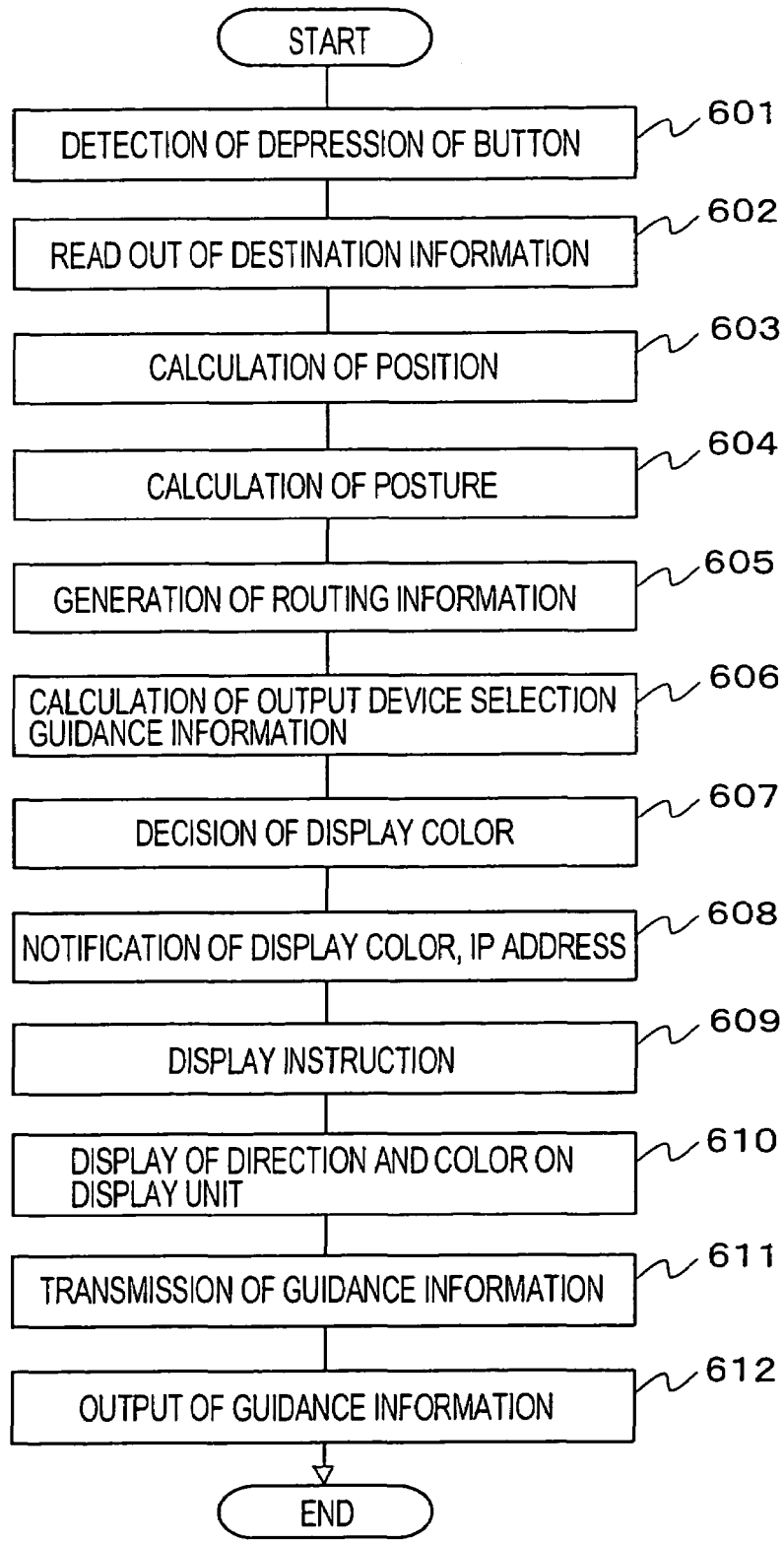
FIG. 11 is a view showing a processing flow of a guidance service of this embodiment.

FIG. 11 shows a processing flow of a guidance service of this embodiment. Here, on the occasion of utilizing the guidance service, it is assumed that a user inserts the IC card 900 into the IC card reader/writer 102.

The guidance output instruction unit 120, when it detects that a user depressed the button 102, instructs the personal information management unit 110 to read out the destination information from the IC card 900 (step 601). The personal information management unit 110 receives the instruction, reads out the destination information from the IC card 900, sends it to the guidance service unit 150, and instructs the position detection unit 130 and the attitude detection unit 140 to start processing (step 602).

The position detection unit 130 calculates position coordinates (XO, YO) of the central position O of the cart 100 (step 603), and the attitude detection unit 140 calculates the direction θ of the cart 100 (step 604).

Next, the guidance service unit 150, on the basis of the central position O of the cart 100 and the destination information received from the personal information management unit 110, refers to information of the floor map management unit 210, and generates route information up to the destination (step 605).

And, the output position selection unit 160 inquires the output device management unit 220, and selects the output device 300, and calculates the guidance information of the destination from the installation direction of the selected output device and the route information calculated in the step 605 (step 606). At this time, the output position selection unit 160 specifies a region in which the selected output device 300 exists (any one of the forward region 901, the rightward region 902, and the leftward region 903).

The output device management unit 220 checks a display color selected by another output device 300 in the vicinity of the selected output device 300, decides a color not selected by them as a display color in a random order (step 607), updates the output device management table 221, and notifies an IP address and a display color of the selected output device 300 to the output device selection unit 160 (step 608).

The output device selection unit 160 notifies the received IP address, the existence region, the display color, and the guidance information of the output device 300 to the guidance information output unit 170, and instructs it to output (step 609).

The guidance information output unit 170 lights up the color which is notified as a display color on the display unit 103 which shows a direction of such a region that the output device 300 is located, (step 610). In this embodiment, for example, in case that an output device in the leftward region 903 is selected, the display color is lighted on 103a located at a left side among the display units 103a to 103c of FIG. 5.

Subsequently, the guidance information output unit 170 accesses to the output device 300 having the IP address 806 obtained by the output device selection unit 160, and sends the guidance information and the display color obtained by the output device selection unit 160 (step 611).

The output device control unit 310 of the output device 300 displays the guidance information on the display device 320 with the selected color (step 612).

Next, the calculation and display of the guidance information will be described taking an example that the guidance information is actually displayed on the output device 300.

Figure 12:
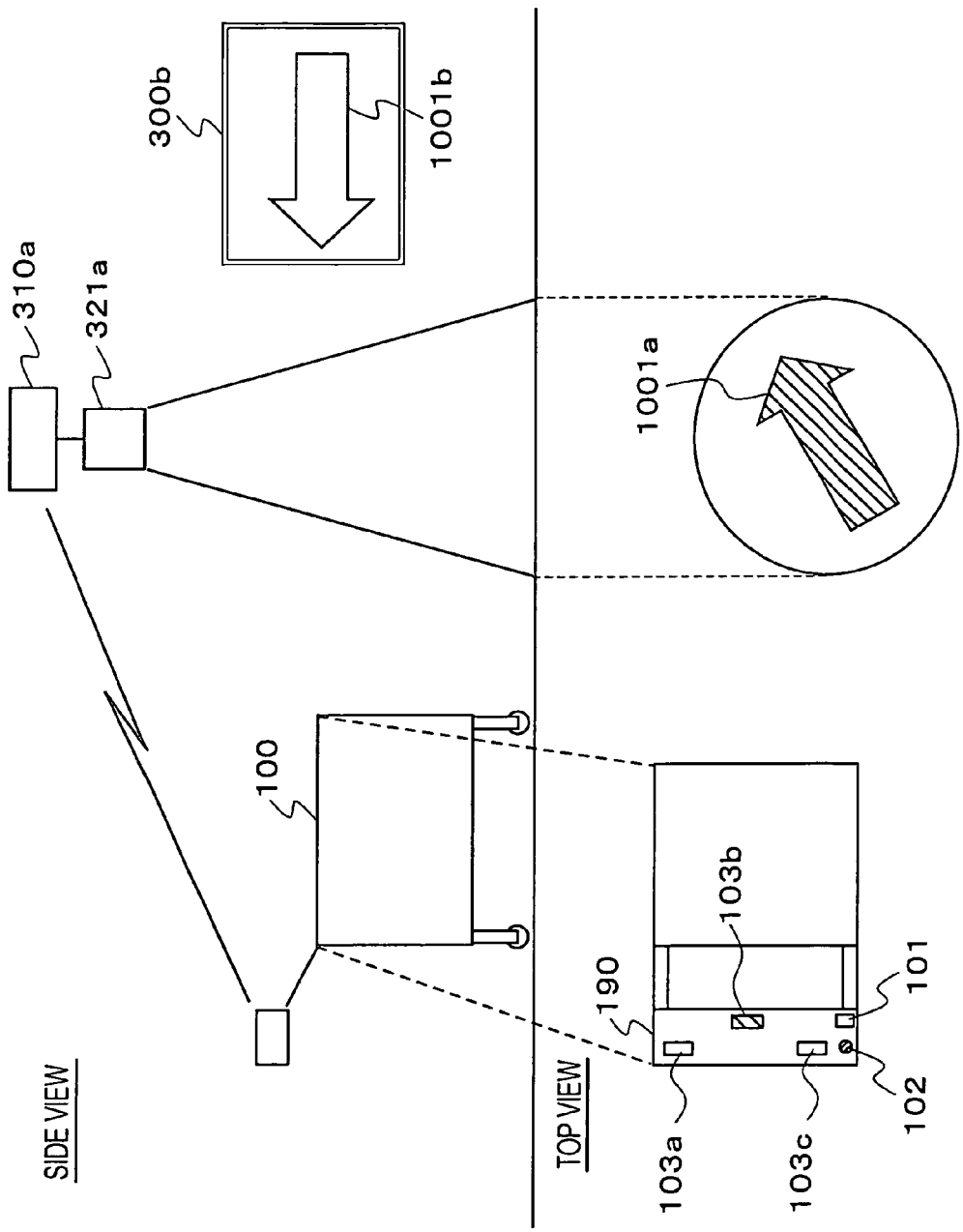
FIG. 12 is a side view and a top view for explaining an actual guidance information displaying state in this embodiment.

FIG. 12 is a side and a top views for explaining such a state that a guidance information 1001a is displayed by a projector 321 in front of the cart 100.

As shown in this figure, a generated guidance information 1001a is sent by wireless communication from the guidance information output unit 170 to the output device control unit 310a of the output device 300a, and for example, a direction to go for a user towards a destination is projected by a narrow as the guidance information 1001a, from a projector 321a placed at the ceiling.

Here, a direction of an arrow to be projected will be obtained by the following procedures.

In the step 606, the output device selection unit 160, on the basis of the route information received from the guidance service unit 150, obtains "a" direction a to be moved at a current position. Next, it calculates a direction of an arrow in accordance with a mathematical formula 7, from a relation with the installation direction "e" of the selected output device 300a stored in the installation state storage unit 803 of the output device management table 211. Here, "X" represents cross product of a vector.

$$Z=(e \times a) \times e \qquad \text{[Mathematical formula 7]}$$

At this time, since the guidance information 1001a is displayed at a forward region to a user of the cart 100, in the display unit 103 of the cart 100, the display unit 103b showing the forward region is lighted.

Also, a display color lighted on the display unit 103b is the same color as a color of an arrow of the guidance information 1001a. And, this display color is a different color from an arrow of the guidance information 1001b displayed on another output device 300b in the vicinity of the output device 300a. In this manner, by changing a display color with respect to each user, it becomes easy for a user to recognize one's own information easily.

Figure 13:
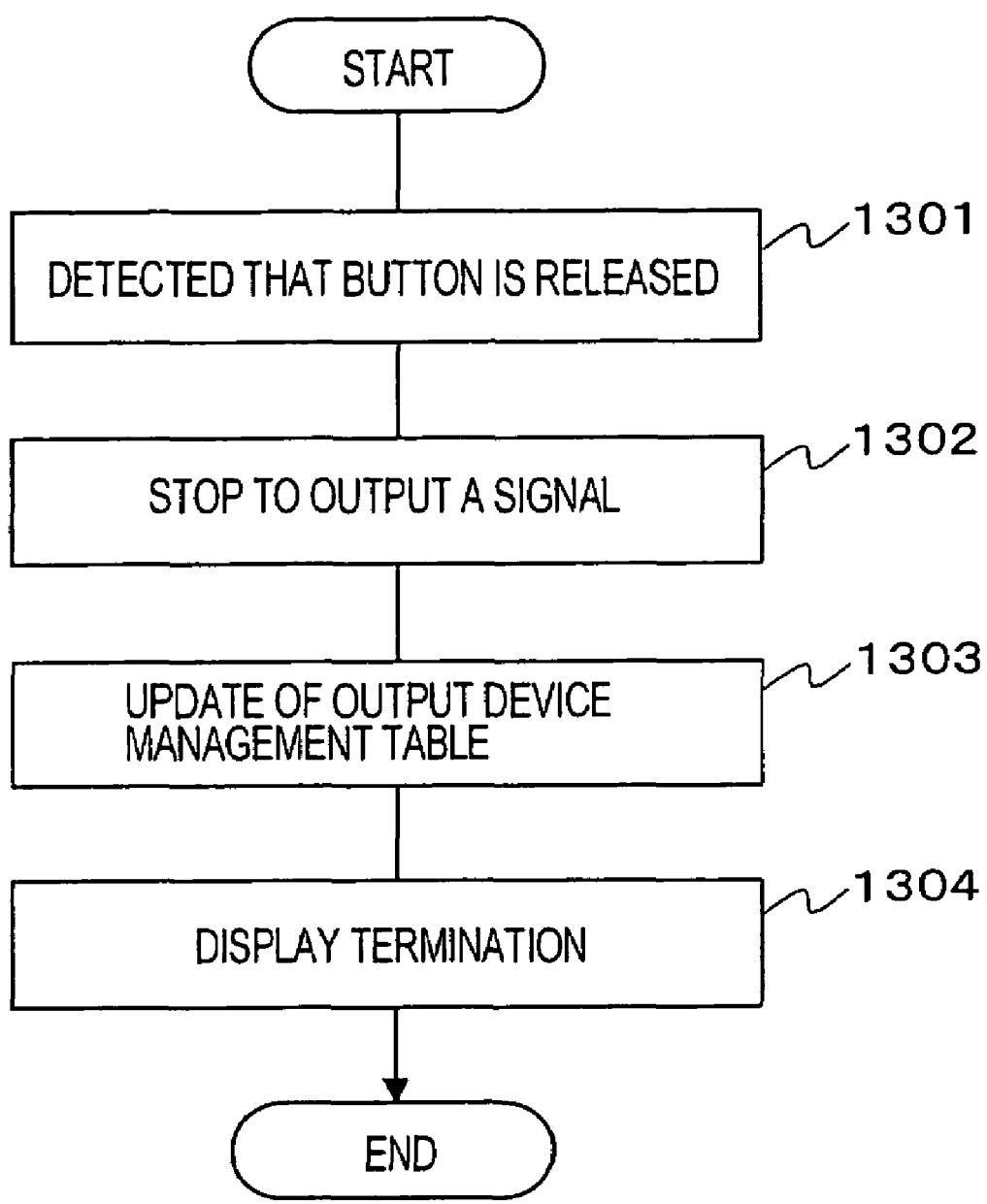
FIG. 13 is a processing flow on the occasion of stopping an output of the guidance information in this embodiment.

Next, a processing flow on the occasion of stopping an output of the guidance information in this embodiment will be described by use of FIG. 13. In this embodiment, by releasing the button 102, a transmission of a signal which instructs to output is stopped and thereby, an output of the guidance information is stopped.

When the button 102 is released (step 1301), the transmission of a signal which instructs to output is stopped, which is sent out to the personal information management unit 110 and the output device selection unit 160 through the guidance output instruction unit 120 (step 1302).

When the output device selection unit 160 does not receive a signal of an output instruction for predetermined time, it assumes that there is a stop instruction, accesses to the output device management unit 220, and notifies of output stop. When the output device management unit 220 receives it, it sets the use state storage unit 804 of the corresponding output device 300 as "vacant", and releases a registration content of the selected color storage unit 805 (step 1303).

Also, the output device selection unit 160 sends an instruction to release display to the display unit 103 and the output device 300, through the guidance information output unit 170, and terminates the display (step 1304).

In addition, in this embodiment, a display color stored in the selected color storage unit 805 is used as a color of the guidance information 1001 itself shown by an arrow, etc., but it may be used as a color of a background and an outer frame of the guidance information 1001. Also, in this embodiment, as service identification information, colors are used but, other than to this, it may be provided by signs and patterns, etc. which can be visually confirmed and identified from others.

Figure 14:
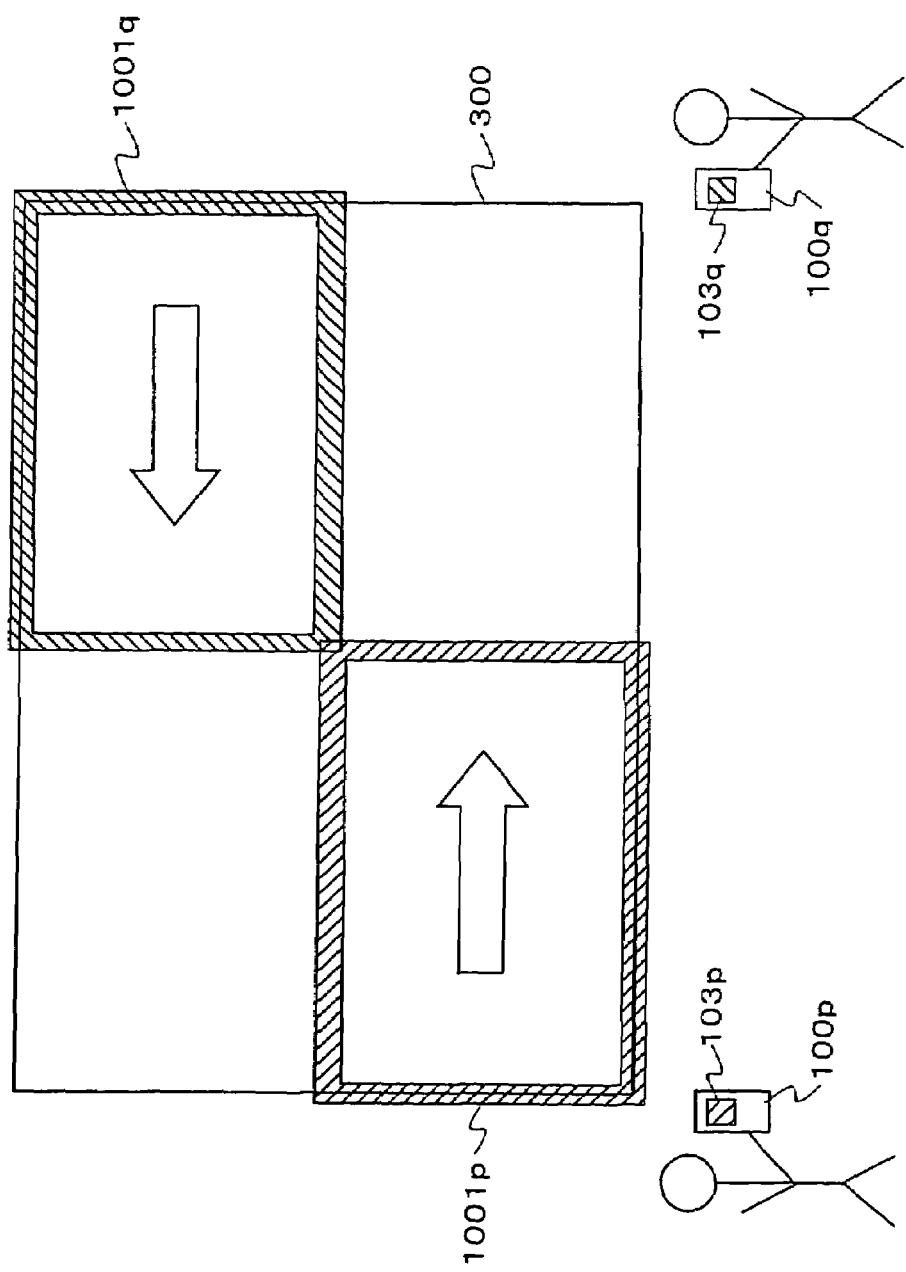
FIG. 14 is a view for explaining another output device use example of the present invention.

Also, in this embodiment, the display device 300 is assigned with respect to each user, but a provision of information to users is not limited to this form. For example, as shown in FIG. 14, it may be configured that a big-size screen display, whose screen can be split up, is used, and the guidance information 1001$p$ to $q$ are displayed on split screen, respectively, by use of colors, patterns, etc. as service identification information.

Furthermore, in this embodiment, a method is used, which presents to users an arrow showing a direction to go, as the guidance information, but a form of the guidance information is not limited to this. For example, as shown in FIG. 15, a route may be displayed by an arrow, on a floor map.

In this display method, using the display colors or the display patterns of the guidance information 1001$r$ to 1001$s$ to be displayed as identification information with respect to each user, it is possible to provide the guidance information targeted to a plurality of users, on one output device. In addition, in the above-described embodiment, it is configured that, as a user proceeds toward a destination, the nearest output device which exists in a predetermined region is selected, on the basis of a use state of each output device. In this case, the output device can be selected out of the output devices having unused colors or patterns, after checking use states of identification colors.

Also, in this embodiment, the processings such as the guidance information generation, the output device selection, etc. are carried out on the cart 100, but it may be configured that they are carried out by an external processing device, e.g., the information management device 200. In this case, it may be configured that the cart 100 sends out a position of itself, an attitude information, a destination information, etc. obtained by itself to the information management device 200, and receives information such as the guidance information, an IP address of an output device, an output color, etc., from the information management device 200.

Furthermore, in this embodiment, the information of a destination is obtained from an IC card inserted, but the means to obtain the destination information is not limited to this. For example, buttons with respect to each destination are provided on the cart 100, etc., and the destination information is accepted by depressing the button.

As described above, this embodiment is characterized in that, a display device which displays the guidance information itself, and is used in an automotive navigation system, etc., is not placed on the cart 100, and that, an information device placed in the floor, which is neighboring information resource, is utilized with sharing for displaying the guidance information. By this, although a processing device held by a user at hand can be miniaturized, it is still possible to obtain the necessary guidance information with an easily viewable size.

Also, in this embodiment, on the occasion of obtaining the guidance information, a user simply depresses a button. This embodiment realizes to provide a service of the guidance information to users by the suchlike simple operation.

Also, in order to specify a device providing information to users, out of a plurality of neighboring information resources, this embodiment has a means which notifies to users a display color of the guidance information displayed on a neighboring information resource. Concretely, a direction of a device which displays the guidance information 1001 and the display color of the guidance information 1001, etc. are displayed in a way easy to understand, such as a method where a color and a direction are coincided with the indication shown in the display unit 103 of the cart 100 at hand, etc. By the specifying method of a neighboring information resource as described above, in this embodiment, personal guidance information is displayed in a public space, but nonetheless, it is difficult to specify the person to whom the displayed information belongs by any other person than oneself, so that one's privacy is protected.

By these configurations, a guidance information providing system of this embodiment realizes that a device at hand can be miniaturized, and necessary information can be displayed by a high visibility method, and furthermore, it becomes easy for only oneself to specify.

In this manner, according to this embodiment, it becomes possible to provide a guidance service by an operation of one button to a user who is not familiar with that place, such as a public space, working together with neighboring output devices. In particular, in case that there are a lot of output device in the vicinity, it becomes possible for users to visually clarify which output device is providing information to himself/herself, and for users to visually hide to be anonymized to whom that service is provided.

In this manner, according to this embodiment, in case that a user requires information on moving, while dynamically utilizing a peripheral equipment, only the user can identify a using peripheral equipment.

What is claimed is:

1. A guidance information providing system which outputs guidance information of a destination in accordance with an operation from a movable operation device, to any one of a plurality of output devices connected to said operation device through a network, comprising:

a position direction obtaining means which obtains a current position and a moving direction of said operation device;

a destination information obtaining means which obtains information of the destination;

a route information generating means which generates route information to said destination from information of said current position and said destination by use of a map information possessed in advance;

an output device management means which manages an information of an installation position of said output device;

an output device selecting means which selects one output device from said plurality of the output devices, on the basis of information of said current position, said moving direction and the installation position of said output device;

a selected output device presenting means which presents an information that specifies said selected output device to the operation device; and an information display instructing means which displays said generated route information displayed on said selected output device in accordance with said information to be specified.

2. The guidance information providing system according to claim 1, comprising, a guidance information calculating means, wherein, said output device management means manages said information to a direction of said output device;

said guidance information calculating means calculates said guidance information of said destination said generated route information and said information of a direction to said selected output device; and said information display instructing means displays said guidance information as said route information.

3. The guidance information providing system according to claim 1, wherein, said information to specify in said selected output device presenting means includes a direction in which said selected output device exists, and a color or/and a pattern to be displayed by said selected output device.

4. The guidance information providing system according to claim 3, wherein, said selected output device presenting means comprises a display means which indicates forward, leftward, rightward, and said direction in which said selected output device exists is indicated by said display means.

5. The guidance information providing system according to claim 1, wherein, said output device selecting means selects an output device which is unused, exists in a predetermined region to said operation device, and gives the shortest distance form the operation device, out of said output devices.

6. The guidance information providing system according to claim 1, wherein, said output device selecting means selects an output device which has an unused one out of usable colors or/and patterns, exists in a predetermined region to said operation device, and gives the shortest distance from the operation device, out of said output devices.

7. The guidance information providing system according to claim 1, comprising, a display stopping means which stops display of said generated guidance information on said selected output device.

8. A guidance information providing method which outputs a guidance information to a destination, in accordance with an operation from a movable operation device, to any one of a plurality of output devices connected to said operation device through a network, comprising:

a position direction obtaining step which obtains a current position and a moving direction of said operation device;

a guidance information generating and a output device selecting step which generates a route information to the destination, from information of said current position and said destination, by use of map information possessed in advance, and selects one output device from said plurality of output devices, on the basis of information of said current position, said moving direction and the installation position of said output device; and an information display instructing step which presents an information to specify said selected output device to the operation device, and displays said generated route information on said selected output device in accordance with said information to specify.

9. The guidance information providing method according to claim 8, comprising a guidance information calculating step which calculates guidance information to the destination from said route information and an information of a direction to said output device managed in said plurality of output devices, and a displaying step which displays said guidance information as said route information, in said information display instructing step.

10. One or more machine-readable medium, containing at least one sequence of instructions that, when executed, causes a machine to effect:

a position direction obtaining means which obtains a current position and a moving direction of a moveable operation device;

a destination information obtaining means which obtains information of a destination;

a route information generating means which generates a route information of the destination from information of said operation device and said destination by use of a map information possessed in advance;

an output device management means which manages information of installation positions of a plurality of output devices connected to said operation device through a network;

an output device selecting means which selects one output device from said plurality of the output devices, on the basis of information of said current position, said moving direction and the installation position of said output device;

a selected output device presenting means which presents an information to specify said selected output device to the operation device; and an information display instructing means to instruct display of said generated route information on said selected output device in accordance with said information to specify.

11. One or more machine-readable medium according to claim 10, wherein:

a computer is functioned as a guidance information calculating means;

said output device management means manages an information of a direction of said output device;

and wherein said at least one sequence of instructions that, when executed, causes the machine to effect:

a guidance information calculating means which calculates said guidance information to said destination from said generated route information and said information of a direction of said selected output device; and said information display instructing means displays said guidance information as said route information.

* * * * *